United States Patent
Blasingame et al.

(10) Patent No.: US 6,623,057 B1
(45) Date of Patent: *Sep. 23, 2003

(54) UNI-DIRECTIONAL LOCKOUT FOR RAILROAD CAR WHEELSET DIFFERENTIAL

(76) Inventors: Thomas W. Blasingame, P.O. Box 1532, Boise, ID (US) 83701; Robert E. Hord, 302 Albemarle Ave., Richmond, VA (US) 23226

( * ) Notice: Subject to any disclaimer, the term of this patent is extended or adjusted under 35 U.S.C. 154(b) by 0 days.

This patent is subject to a terminal disclaimer.

(21) Appl. No.: 09/582,897

(22) PCT Filed: Feb. 9, 1999

(86) PCT No.: PCT/US99/02762
§ 371 (c)(1),
(2), (4) Date: Oct. 2, 2000

(87) PCT Pub. No.: WO99/39926
PCT Pub. Date: Aug. 12, 1999

Related U.S. Application Data

(63) Continuation-in-part of application No. 09/021,604, filed on Feb. 10, 1998, now Pat. No. 6,007,126, which is a continuation of application No. 09/004,362, filed on Jan. 8, 1998, now Pat. No. 6,048,015.

(51) Int. Cl.⁷ ............................................. B60B 37/10
(52) U.S. Cl. ............................ 295/37; 295/44; 105/130; 192/50
(58) Field of Search .............................. 295/1, 5, 36.1, 295/37, 39, 40, 43, 44, 48; 105/128, 130; 192/43.1, 47, 50

(56) References Cited

U.S. PATENT DOCUMENTS

| 12,572 A | 3/1855 | Prentiss |
| 50,579 A | 10/1865 | Harris |
| 1,141,406 A | 6/1915 | Ollard |
| 4,575,145 A | 3/1986 | Wolfram et al. |
| 5,070,978 A | * 12/1991 | Pires .......................... 192/45.1 |
| 6,007,126 A | * 12/1999 | Blasingame et al. .......... 295/37 |

* cited by examiner

Primary Examiner—Russell D. Stormer

(57) ABSTRACT

A railroad car wheelset has an axle with one wheel (14A) rigidly attached. This wheel is permitted to rotate by means of journal bearings either on the extreme ends of the axle or inboard of each wheel location. At the other wheel, the axle has smooth surface and a self-lubricating bearing (54) is provided as a part of a hub on the axle. The hub is integral with the axle or press fit thereon. The axle has a boss for preventing the independently rotating wheel from migrating laterally out of proper alignment. A self-lubricating thrust bearing (32) is located between this boss and the side of the wheel to eliminate any possible galling between the two moving surfaces.

8 Claims, 18 Drawing Sheets

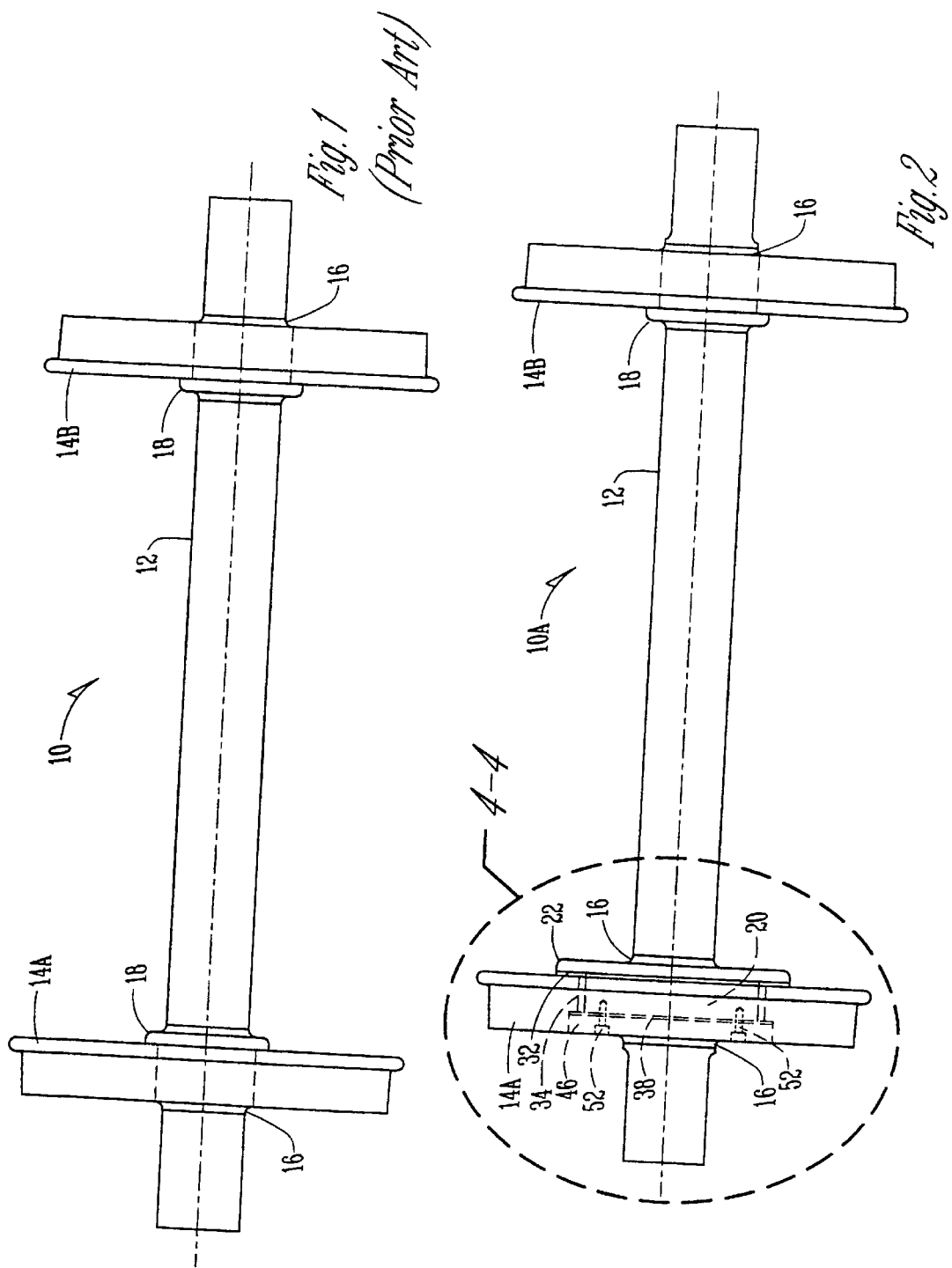

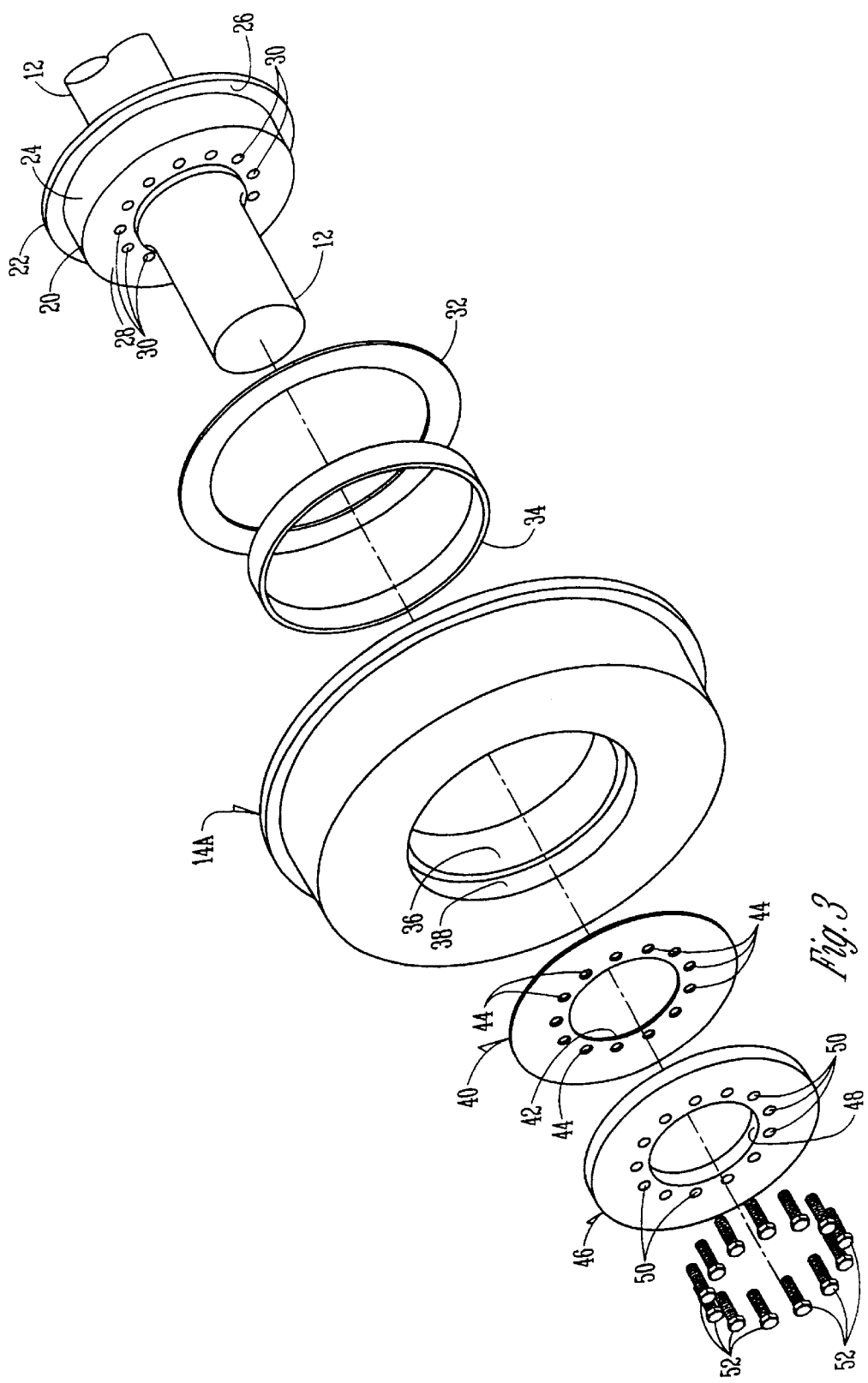

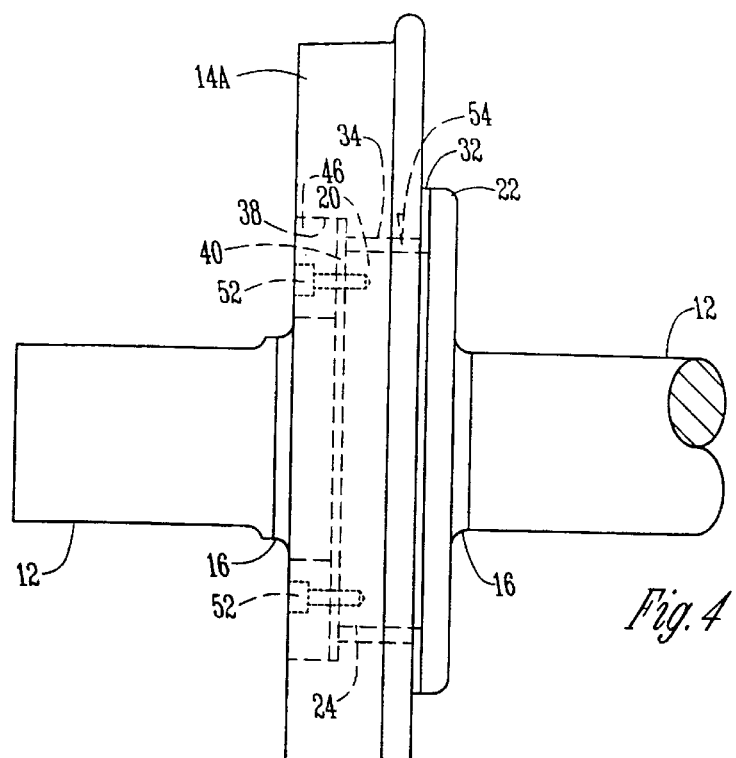
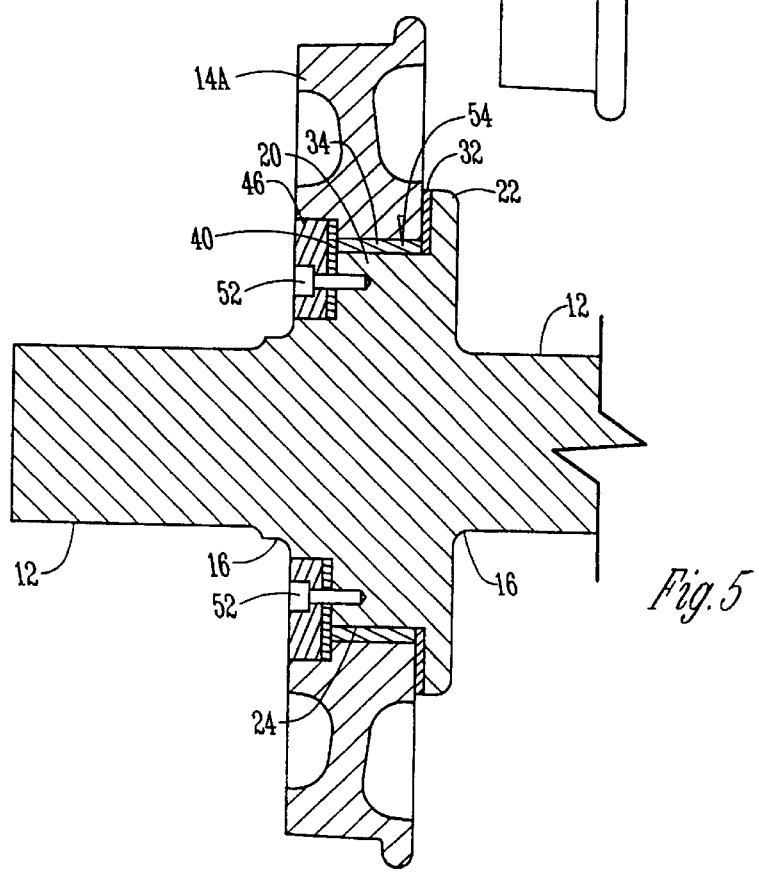

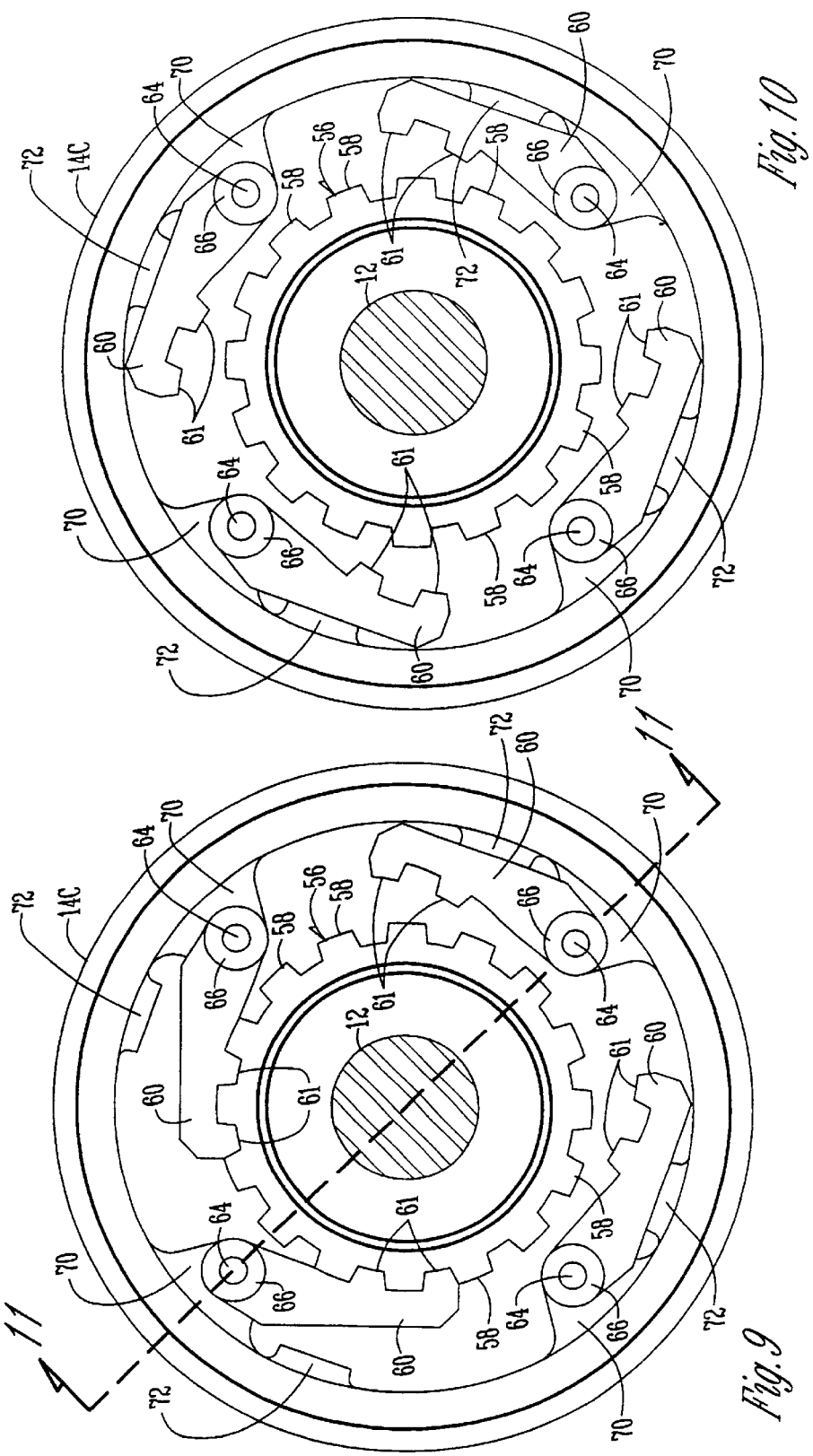

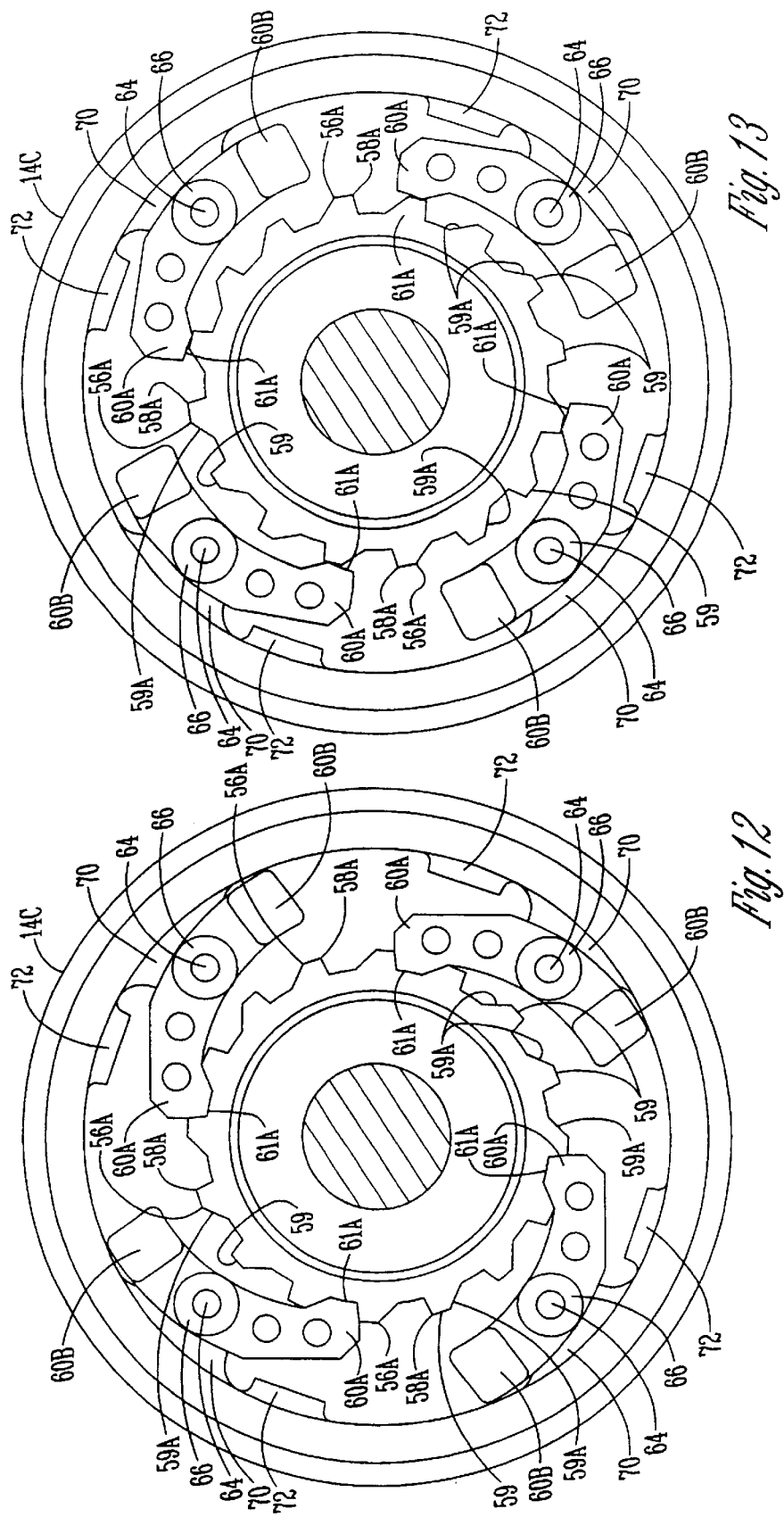

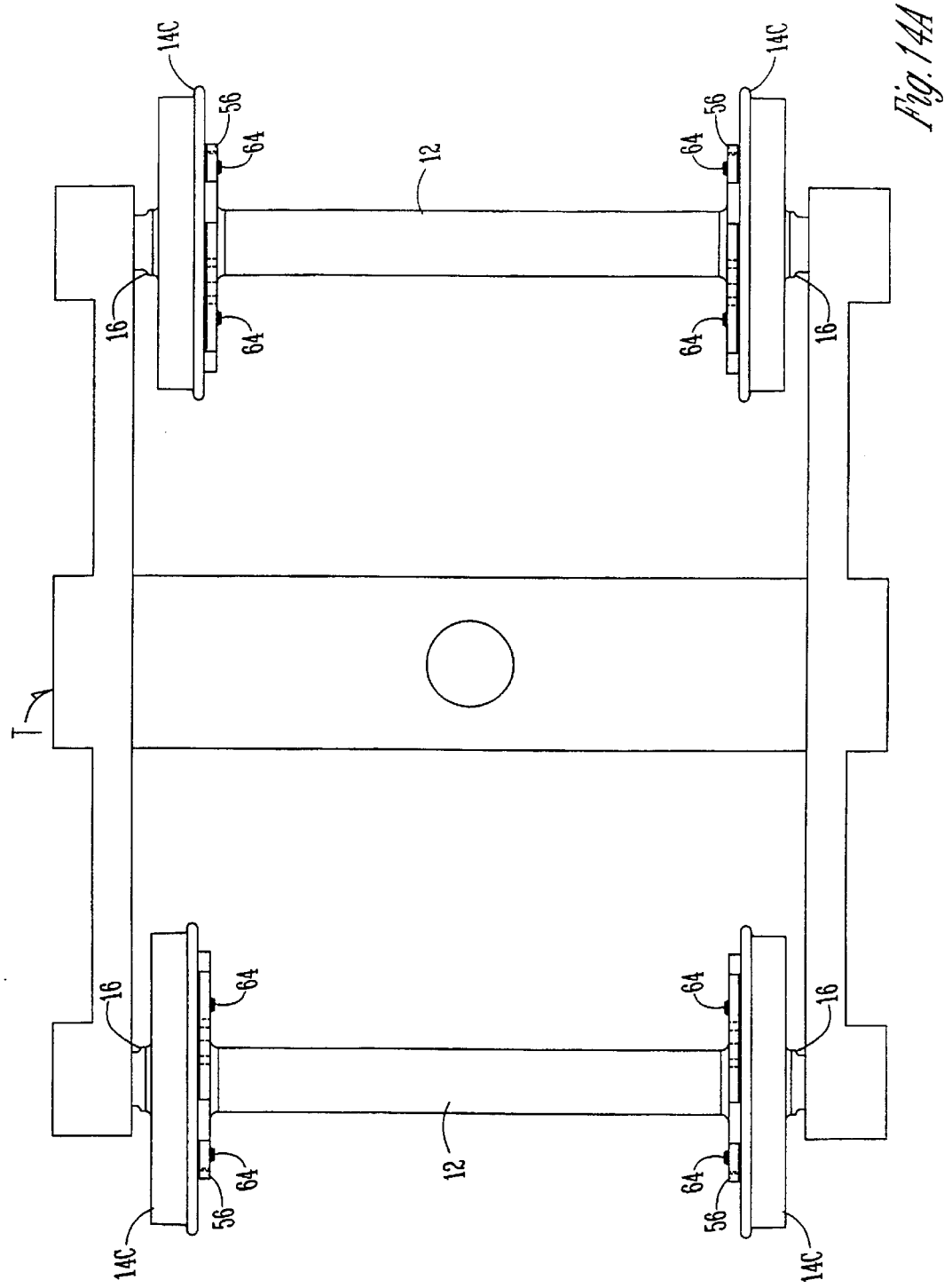

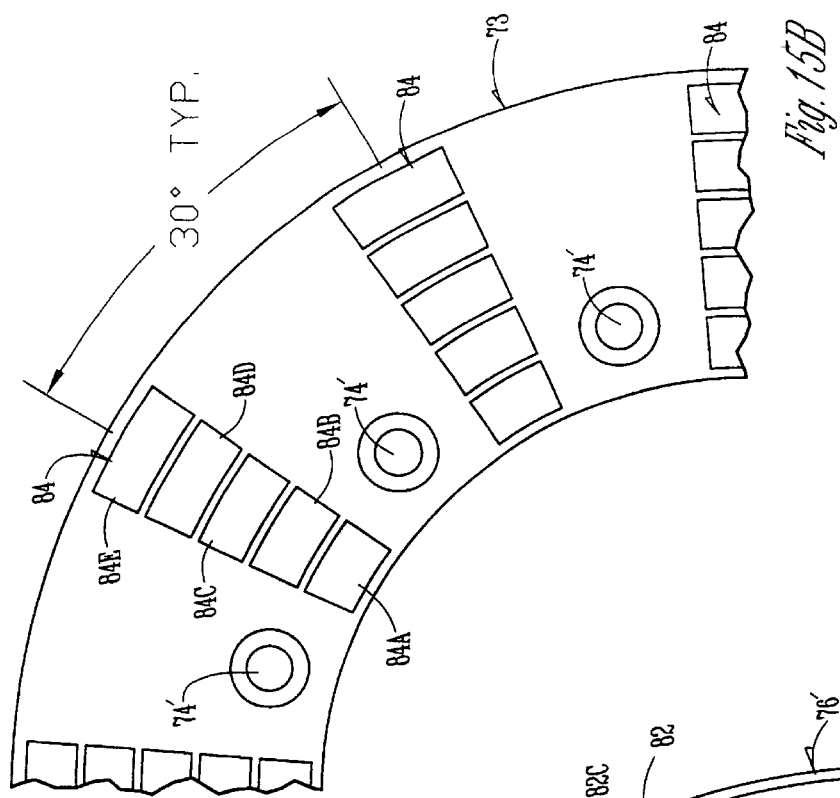
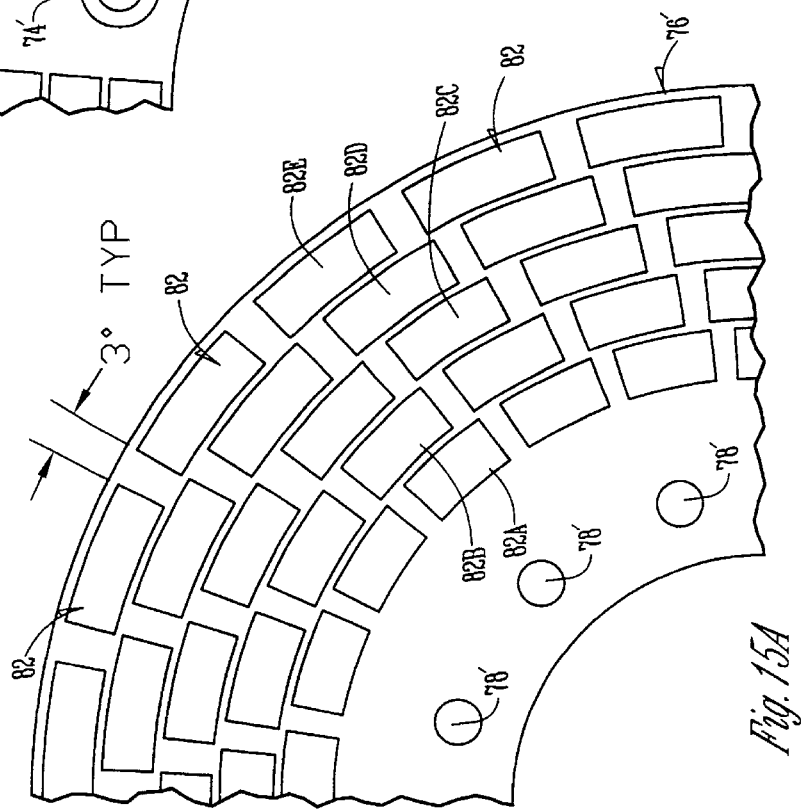

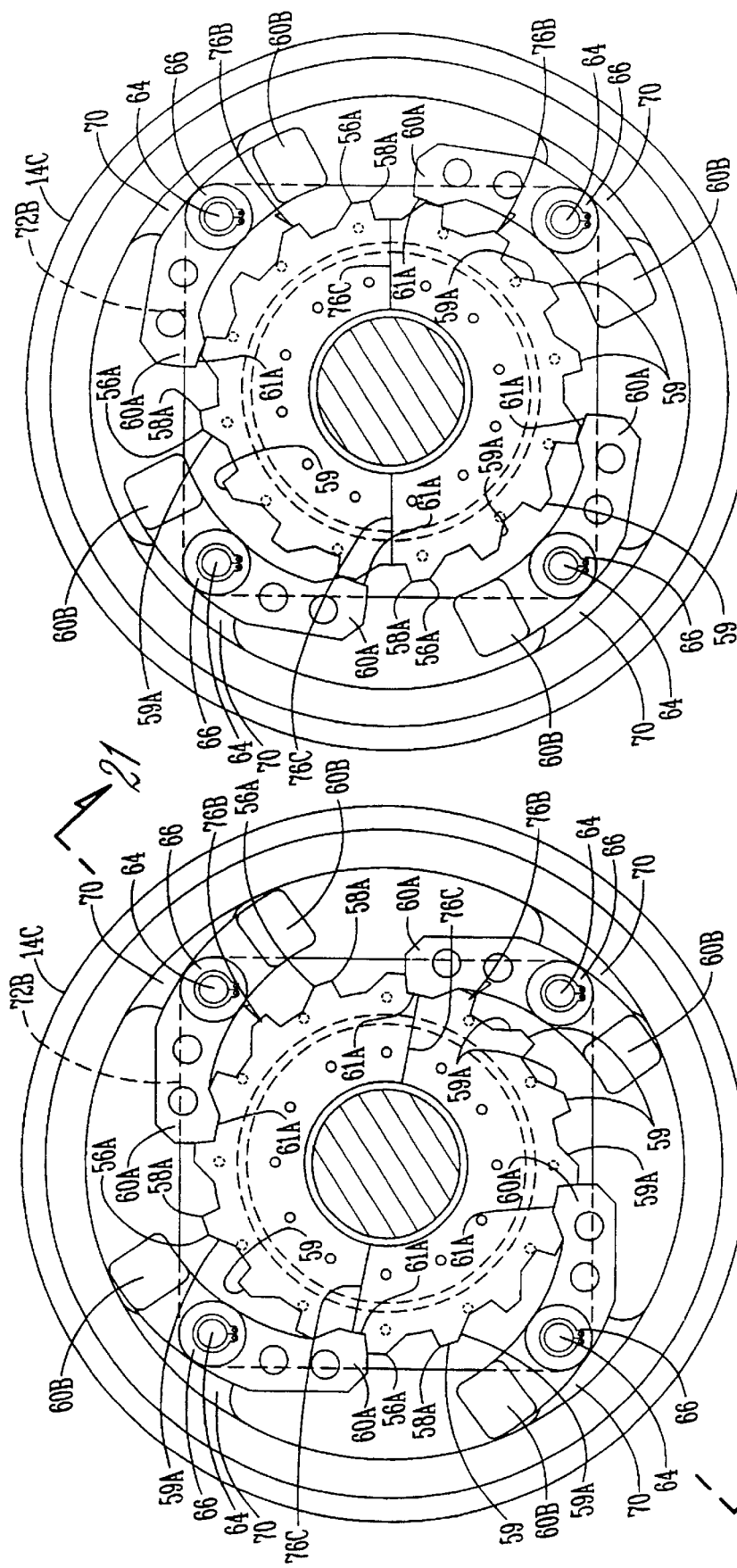

UNI-DIRECTIONAL LOCKOUT FOR RAILROAD CAR WHEELSET DIFFERENTIAL

This is a continuation in part of Ser. No. 09/021,604 filed Feb. 10, 1998 now U.S. Pat. No. 6,007,126 which is a continuation of Ser. No. 09/004,362 filed Jan. 8, 1998 now U.S. Pat. No. 6,048,015.

BACKGROUND OF THE INVENTION

Wheelsets for railroad cars are usually comprised of an axle and two wheels. The wheels are pressed on to the axle shaft and are rigidly mounted so that both wheels turn exactly the same degree of rotation during operation. The wheelset assembly may be supported by journal bearings outboard of each wheel or the bearings may be located inboard of the wheels. The rigid assembly of the wheels on the axle and the lack of independent rotation of the wheels is the cause of slippage on the rail when the wheelset operates in curved sections of track. This slippage causes wear on the wheel treads and rails and is a prime cause of corrective maintenance on both the wheels and the track.

Efforts have been made to overcome the problems associated with the rigid assembly of conventional wheelsets by placing bearings between the axle and the wheel on at least one end of the axle to permit differential speeds of rotation of the wheels at opposite ends of the axle. In such cases, a hub is located on at least one end of the axle and a wheel is mounted on the hub or on the axle and its rotation with respect to the axle is facilitated by a bearing assembly. As discussed hereafter, electrical continuity from the two rails through the wheels and the axle is necessary for operation of signal devices or the like. This electrical continuity was established with the conventional railroad wheelsets wherein the wheels were rigidly fixed through opposite ends of the axle. However, with the advent of one of the wheels being mounted on the axle by means of a bearing assembly, the electrical continuity between the wheels was less than perfect. With the advent of non-metallic bearings, the electrical continuity was not possible.

A typical signal device for a road crossing, for example which utilizes a crossing arm, flashing lights, and the like, derives electrical energy from any conventional source. A low voltage is imposed on a given dedicated length of rail on opposite sides of the signal, with the opposite rail being electrically connected to the signal whereupon the signal circuit is closed when the wheel assembly of a train initially moves onto the dedicated length of rail. The circuit is completed between the opposite rails through the wheels and axle of the train's wheel assemblies which allow the flow of energy therethrough to electrically connect the opposite rails.

Even when a differential action wheelset is used, an adverse situation may arise wherein, upon beginning motion, one of the independent wheels moves in one direction and the other wheel on the axle moves in the opposite direction in a pivoting effect. That is because when an axle is provided with one or more independently rotatable wheels, it is possible for the axle to rotate about its vertical centerline if one of the wheels rotates in one direction and the other wheel rotates in the opposite direction. If the axle with the independently rotatable wheels is mounted in a short wheelbase two-axle truck, it may be possible for the two wheels on one side of the truck to move in one direction, while the two wheels on the other side of the truck rotate in the opposite direction. This action may result in derailing the truck and will be more pronounced and prevalent in a short wheelbase two-axle truck than in a long wheelbase two-axle truck.

Field testing by the American Association of Railroads (described in ASME Paper No. 7-5, dated Sep. 12–15, 1988) indicates that in certain situations it is desirable to have the wheelset in the leading axle position of a multi-axle truck be equipped with non-independent wheel rotation, and the wheelset in the trailing axle position equipped with independently rotating wheels. The problem in such an arrangement is that the leading axle wheelset when the railroad car is operating in one direction is the trailing axle wheelset when the railroad car operates in the opposite direction.

It is, therefore, a principal object of this invention to provide a railroad car wheelset with independently rotating wheels in which the differential action is made inoperable upon stopping and at lower speeds, and when the differential action is automatically resumed when the wheel rotation reaches a predetermined operational speed.

A further object of this invention to provide a railroad wheelset with independent rotation of wheels with respect to each other which will consistently retain the electrical continuity between the opposite wheels and the rails upon which they are supported.

A still further object of this invention is to provide a wheelset with independent rotation of the wheels with respect to each other which can be used in existing truck designs without modification to the truck structures or the braking system.

A still further object of this invention is to provide a railroad wheelset which requires no additional maintenance than conventional rigid wheelsets after installation and during service.

A still further object of this invention is to provide a railroad wheelset with independently rotating wheels in which the differential action is made available with no decrease in safety or reliability.

A still further object of this invention is to provide a railroad car wheelset with independent wheel rotation which can be economically manufactured and applied to railroad cars of all types.

A still further object of this invention is to provide a railroad car wheelset in which both wheels can rotate independently in one direction on the axle, and be locked against rotation in the other direction.

A still further object of this invention is to provide the alternate capability of operating a wheelset either as a fixed-wheel wheelset in one direction and as an independently rotatable wheel wheelset in the opposite direction.

A still further object of this invention is to permit the alternate capability to be achieved using a minimum of special parts and a maximum of common parts.

These and other objects will be apparent to those skilled in the art.

SUMMARY OF THE INVENTION

The railroad car wheelset of the present invention includes an axle with one wheel rigidly attached as in conventional railroad practice. This wheel is permitted to rotate by means of journal bearings either on the extreme ends of the axle or inboard of each wheel location. At the location of the other wheel, the axle is provided with a smooth surface and a self-lubricating bearing is provided. The axle shaft is provided with a boss or other means of preventing the independently rotating wheel from migrating laterally out of proper alignment. A self-lubricating thrust bearing is located between this boss and the side of the wheel to eliminate any possible galling between the two moving surfaces. A removable retainer plate is located on the other side of the independently rotating wheel to prevent the wheel from moving laterally in that direction. Adjacent the removable retainer plate is an electrical contactor which can conduct an electrical current from the wheel to the axle shaft, to permit the wheelset to properly operate railway signals or other systems dependent on electrical continuity. In lieu of the self-lubricated bearings, the bearings can be comprised of a lubricant coating permanently bonded to the bearing surface of the hub adjacent the independently rotatable wheel.

An axle with two wheels in which one wheel may rotate independently of the other may be pivoted about its vertical centerline in the event one of the wheels rotates in one direction and the other wheels rotate in the opposite direction. The railroad car wheelset of the present invention may include a means of locking the independently rotatable wheel to the axle rigidly when the rotation of the wheel ceases, or when the wheel is rotated slowly. This locking means automatically releases when the wheel and axle reach a predetermined speed of rotation, at which time the differential action of the independently rotating wheel is again permitted.

An alternate form of the present invention is provided for situations in which one of the wheelsets in a truck is desired to be of the fixed-wheel type in one direction and also is desired to function as an independently rotatable wheel wheelset in the opposite direction. The railroad car wheelset of the present invention includes a means of locking the independently rotatable wheel to the axle rigidly when the rotation of the wheel is in one direction, and automatically unlocking the independently rotatable wheel from the axle when the rotation of the wheel is in the opposite direction. The proper arrangement of these wheelsets in the truck frame permits the leading axle to automatically operate as a fixed-wheel wheelset and the trailing axle to operate as an independently rotatable wheel wheelset regardless of which direction the railcar is moving.

Thus, the independently rotatable wheel is locked to the axle automatically in one direction and permits the independent rotation of the wheel automatically when the rotation is in the opposite direction. By arranging the wheelsets 180° from each other in the truck frame (as shown in FIG. 14), the trailing axle is always equipped with independently rotating wheels and the leading axle is always functioning as a conventional axle with two fixed and non-independently rotating wheels.

The hubs are either integral with the axle, or pressed on the axle. An alternate form of the invention is provided in which both wheels can rotate independently on the axle in one direction, and be restrained from rotating independently in the opposite direction.

BRIEF DESCRIPTION OF THE DRAWINGS

FIG. 1 is an elevational view of a conventional prior art railroad wheelset;

FIG. 2 is an elevational view of the preferred embodiment of the railway wheelset;

FIG. 3 is an exploded view of the components within the line 4—4 of FIG. 2;

FIG. 4 is an enlarged scale view of the components contained within the line 4—4 of FIG. 2;

FIG. 5 is a transverse sectional view of the structure of FIG. 4;

FIG. 9 is an elevational view looking at the inside of the independently rotatable wheel when it is stopped or operating at low speed, showing the upper rotatable latches engaging the toothed integral axle retainer hub;

FIG. 10 is an elevational view looking at the inside of the independently rotatable wheel when it is rotating above a predetermined speed, showing that the rotatable latches have moved outwardly and that none of the rotatable latches engage the toothed integral axle retainer, and that the wheel is again able to rotate independently of the axle;

FIG. 12 is an elevational view looking at the inside of the alternate form of the independently rotatable wheel when it is operating in a clockwise manner;

FIG. 13 is an elevational view looking at the inside of the alternate form of the independently rotatable wheel when it is operating in a counter-clockwise manner.

FIG. 14A shows a similar arrangement showing linking devices on all four wheels;

FIGS. 15A and 15B are partial elevational views of inner and outer clutch plates of an alternate form of the invention;

FIGS. 18 and 19 are elevated views similar to FIGS. 12 and 13 but show an alternate form of the invention using a bolt on latch pin mounting plate and a two piece ratchet gear.

DESCRIPTION OF THE PREFERRED EMBODIMENT

Figure 6:
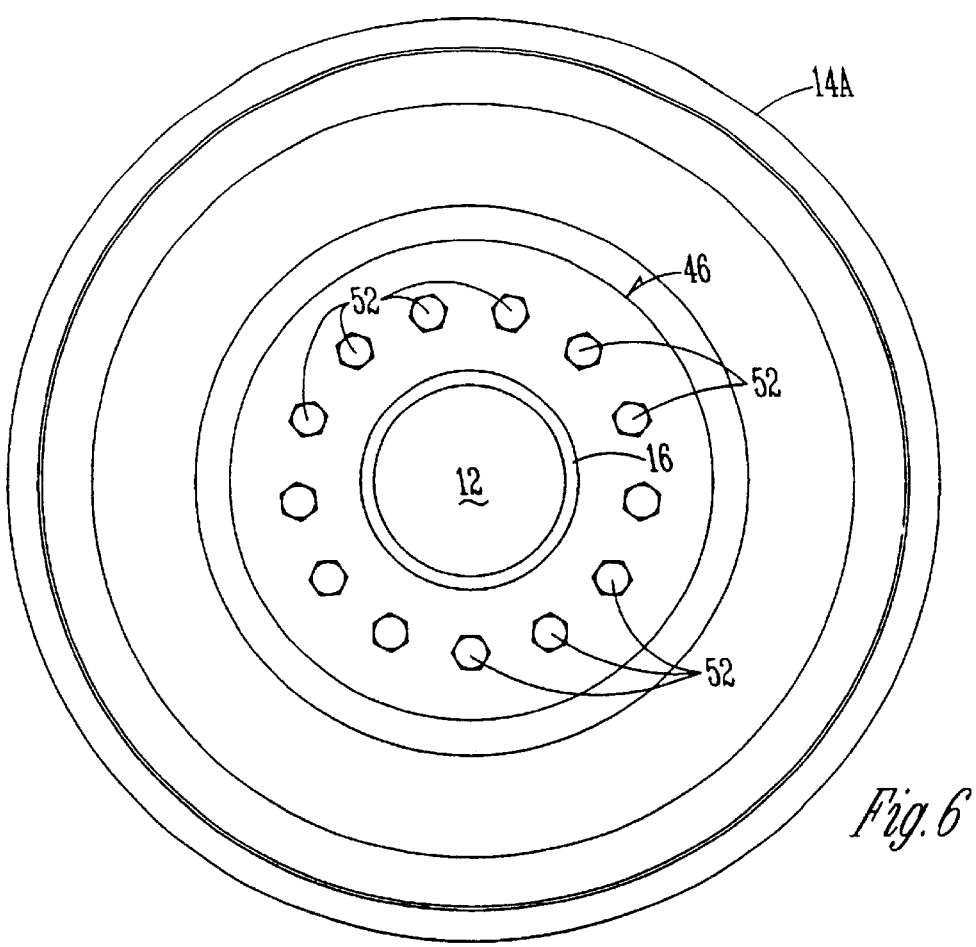
FIG. 6 is an elevational view of the structure of FIG. 4 as viewed from the left-hand side of FIG. 4.
Figure 7:
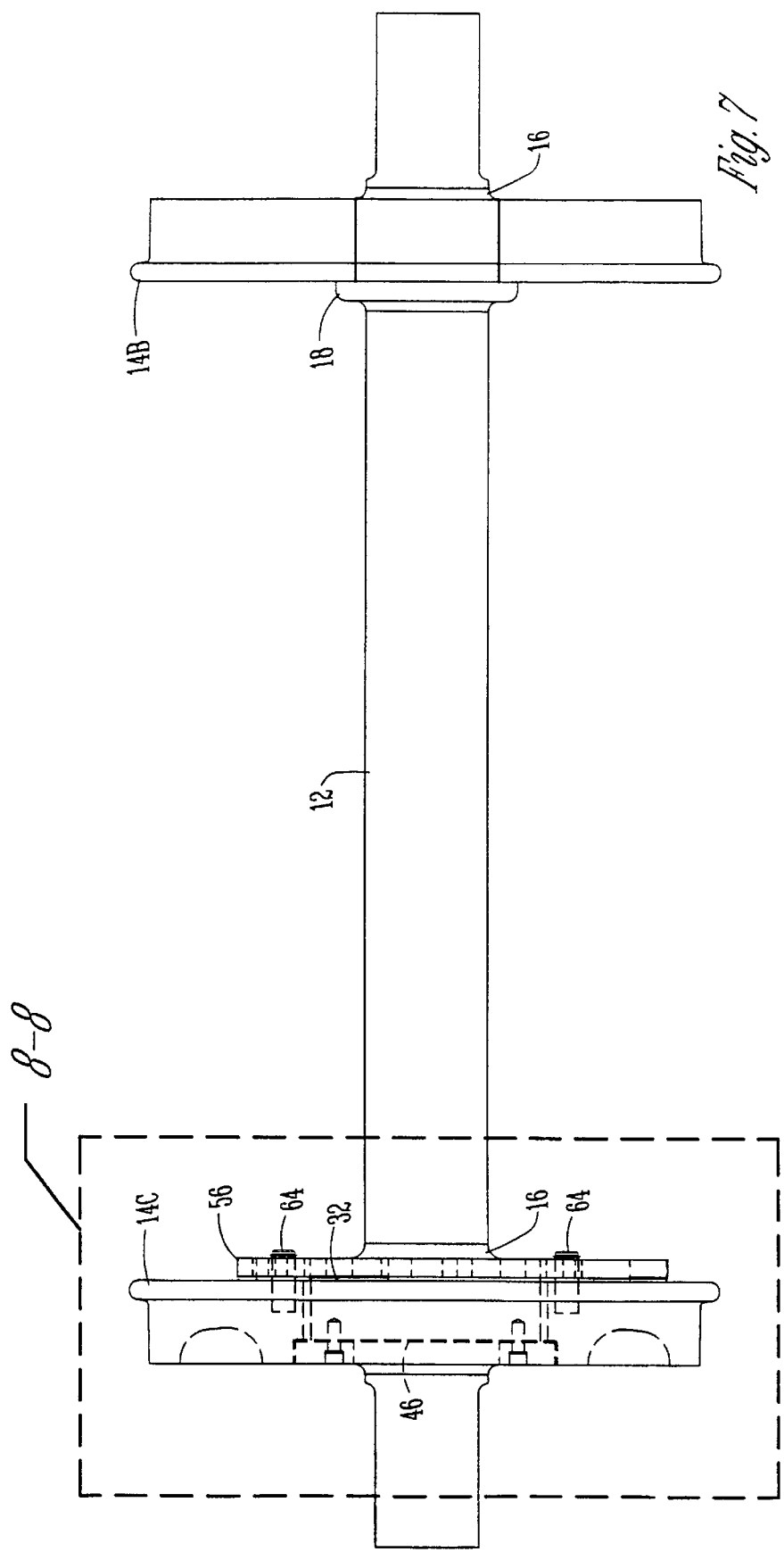
FIG. 7 is an elevational view similar to that of FIG. 2 but shows the preferred embodiment of this invention.

The conventional prior art wheelset 10 is shown in FIG. 1 and is comprised of the horizontal axle 12 with wheels 14A and 14B adjacent its opposite ends. The wheels 14A and 14B are each rigidly secured to axle 12 by being pressed on the axle up against bosses 18, respectively.

A preferred differential action railroad car wheelset is shown in FIGS. 2, 3, 4, 5 and 6. With reference to FIG. 2, the right-hand wheel 14B is affixed to the axle 12 in the same manner that wheel 14B was secured to the axle 12 in FIG. 1. However, at the other end of axle 12 in FIG. 2, a hub 20 is integral with the axle 12. Hub 20 has an annular flange 22 of increased diameter. With reference to FIG. 3, hub 20 has a cylindrical bearing surface 24 and a vertical bearing surface 26 adjacent thereto. A vertical circular face 28 on hub 20 has a plurality of threaded apertures 30.

A cylindrical flat planar thrust bearing 32 is mounted on bearing surface 24 and when assembled, bears against bearing surface 26. A cylindrical sleeve bearing 34 is then mounted on bearing surface 24 adjacent the thrust bearing 32. In assembly, the wheel 14A which has a large diameter center bore 36 is slidably mounted on the sleeve bearing 34 (FIG. 5). The center bore 36 of wheel 14A has an annular groove 38 on the outboard side thereof. A circular metal conductor plate 40 with the center opening 42 and a plurality of apertures 44 (equal in number and size to apertures 30 in face 38 of hub 20) is mounted within annular groove 38. A retainer plate 46 (FIGS. 3 and 5) is also mounted in annular groove 38. Retainer plate 46 has a center opening 48 and a plurality of apertures 50. Conventional threaded bolts 52 extend through the registering apertures 50 (in retainer plate 46); 44 (in conductor plate 40); and 30 (in hub 20).

It should be noted (FIG. 4) that a space 54 exists between the bearing surface 24 of hub 20 and the center opening or bore 36 in wheel 14A. This space is normally occupied by sleeve bearing 34. However, in an modified form of the invention, the space 54 can be filled with a lubricating coating (not shown), in lieu of the sleeve bearing 34. Wheel bore 36 can be adjusted in diameter as required.

There are available in the industry synergistic coatings (e.g., Hi-T-Lube®) which become an integral part of the top layer of a base metal rather than merely a surface cover. This lubricating coating has a hard interface metal layer adjacent the base metal; a semi-soft, compressible metal layer adjacent the base metal; a semi-soft, compressible metal layer adjacent the hard interface layer; a hard, thin oxide layer adjacent the compressible layer; and an outer malleable, dry lubricant layer on the outer surface of the thin oxide layer. This lubricating layer can resist wear of the base metal by up to 15 times under cryogenic conditions. This and other lubricating coatings in the industry in environments from room temperature up to 1000 degrees Fahrenheit can withstand high applied loads at relatively high speeds and frequent reversal in direction. Under such conditions, these products performed effectively for long periods of time where other lubricants and combinations of materials failed in a relatively short period of time. The thickness of the coating (and the radial height of space 54) can be in the order of 0.0003 inches–0.001 inches in thickness and has a coefficient of friction in the range of 0.03 and can withstand high compression loads in excess of 150,000 psi. Hardness of available material is up to an equivalent of Rc 55.–$R_c$ 85. These materials are not, per se, a part of this invention and have not been previously used in the application of bearings for railway wheelsets but the present invention makes provision for this technology.

It should be understood that the space 54 normally occupied by a bearing sleeve 34 could be occupied by the lubricating coating described heretofore instead of the sleeve bearing 34.

It is therefore seen that the wheelsets of this invention can be easily assembled and can easily create a wheelset with a single rigid wheel at one end of the axle and an independently rotatable wheel at the other end of the axle. The electrical continuity through the wheelset is guaranteed by the presence of conductor plate 40 which can maintain this electrical continuity without having to pass through the wheel bearings themselves. With reference to FIG. 2, the electrical continuity between the rails upon which wheels 14A and 14B are mounted is completed from the rail under wheel 14B through wheel 14B and thence through axle 12, through conductor plate 40, and into wheel 14A to the opposite rail.

DESCRIPTION OF ALTERNATE FORMS OF THE INVENTION

As previously indicated, when the axle is provided with one or more independently rotatable wheels, it is possible for the axle to rotate about its vertical centerline if one of the wheels rotates in one direction and the other wheel rotates in the opposite direction. If the axle with the independently rotatable wheels is mounted in a short wheelbase two-axle truck, it may be possible for the two wheels on one side of the truck to move in one direction, while the two wheels on the other side of the truck rotate in the opposite direction. This action may result in derailing the truck and will be more pronounced and prevalent in a short wheelbase two-axle truck than in a long wheelbase two-axle truck.

To prevent the independently rotatable wheel from rotating in the opposite direction from the other wheel, an automatic locking means is provided to prevent the rotation of the independently rotatable wheel when stopped or when operating at low speeds. When the rotation of the locked independently rotatable wheel reaches a predetermined rotational speed, the locking means automatically releases and the differential action can again be utilized.

With references to FIGS. 7–11, an independently rotatable wheel 14C is shown. The axle retainer hub 56 has been modified to provide engagement teeth 58 for releasable engagement with a plurality of pivoting latches 60 which are equipped with self-lubricating bearings 62 mounted on pivot pins 64. Each latch 60 has engagement teeth 61 adapted to nest at times between teeth 58 on hub 56. Each pivot pin 64 is equipped with self-lubricating thrust bearing latch retainers 66 which are in turn secured by means of stainless steel snap rings 68 or equivalent. Each pivot pin 64 is securely inserted into a latch boss 70 made integral with the wheel. The latch boss may be deleted when a separate latch pin mounting plate is used, attached to the wheel as shown in FIGS. 18 and 19, as discussed hereafter. Also integral with and offset from the wheel are a plurality of latch stops 72 which restrict the travel of the pivoting latches 60 from excessive outward travel.

FIG. 9 shows the configuration of the rotatable latch 60 when acted upon by gravity when the independently rotatable wheel 14C is rotating slowly or is at rest in a motionless state. FIG. 10 shows the position of the rotatable latches 60 when acted upon by centrifugal force and restrained from further outward motion by integral latch stops 72.

The foregoing structure of FIGS. 7–11 provide means for locking the independently rotatable wheel to the axle rigidly when the rotation of the wheel ceases, or when the wheel is rotated slowly. This locking means automatically releases when the wheel and axle reach a predetermined speed of rotation, at which time the differential action of the independently rotating wheel is again permitted. A typical speed at which this takes place is 5–10 mph or a wheel speed of 50–100 rpms. This is accomplished by the axle retainer hub 56 being provided with teeth 58 for releasable engagement by the rotatable latches 60 pivotally mounted on pivot pins 64, said rotatable latches engaging the toothed retainer hub 36 by gravitational action when the wheel 14C is not rotating or rotating at slow speed, and the rotatable latches 60 disengaging teeth 58 due to centrifugal force when the wheel 14C rotates beyond a predetermined speed.

Figure 8:
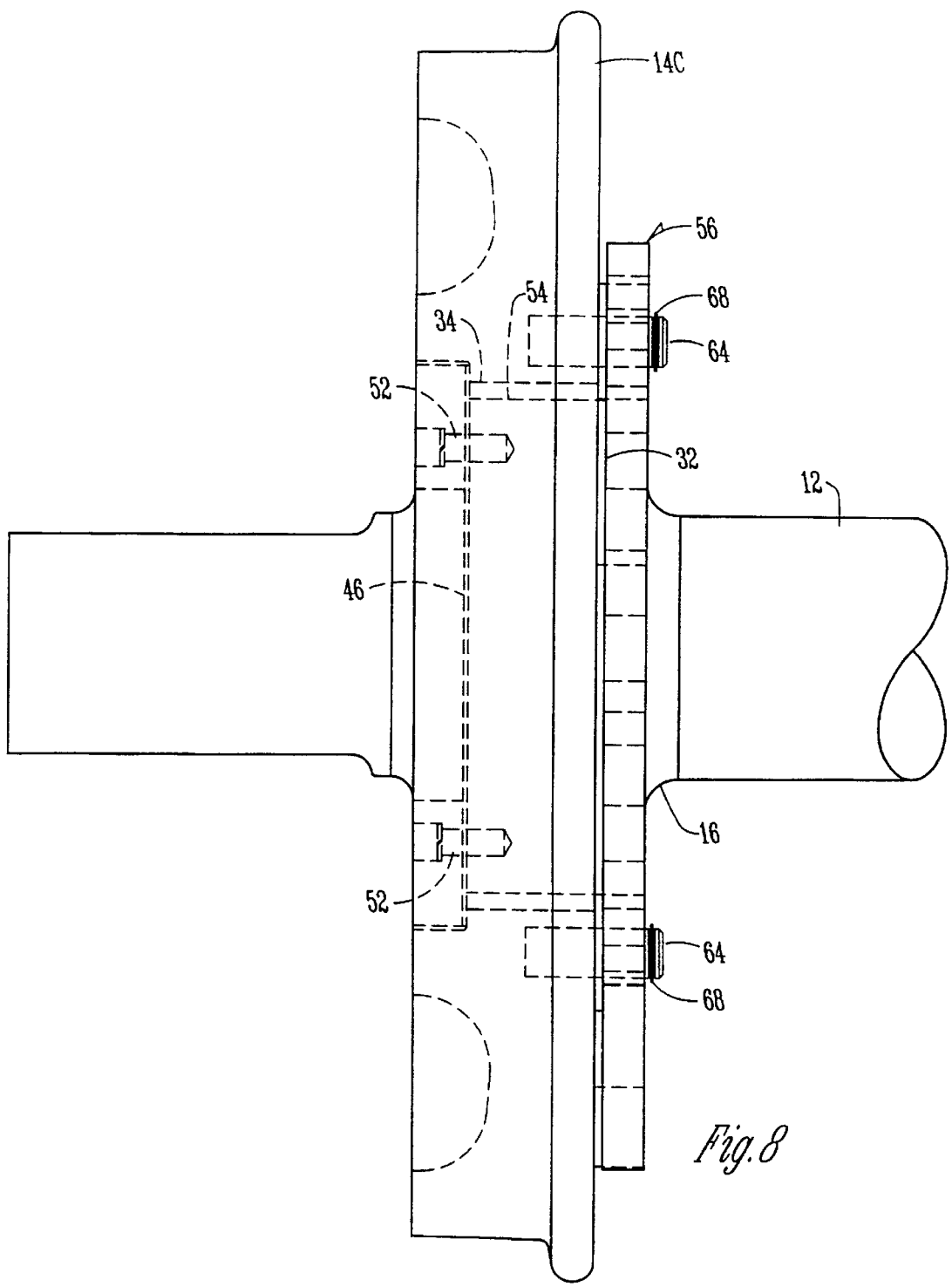
FIG. 8 is a large scale partial elevational view taken on line 8—8 of FIG. 7.
Figure 11:
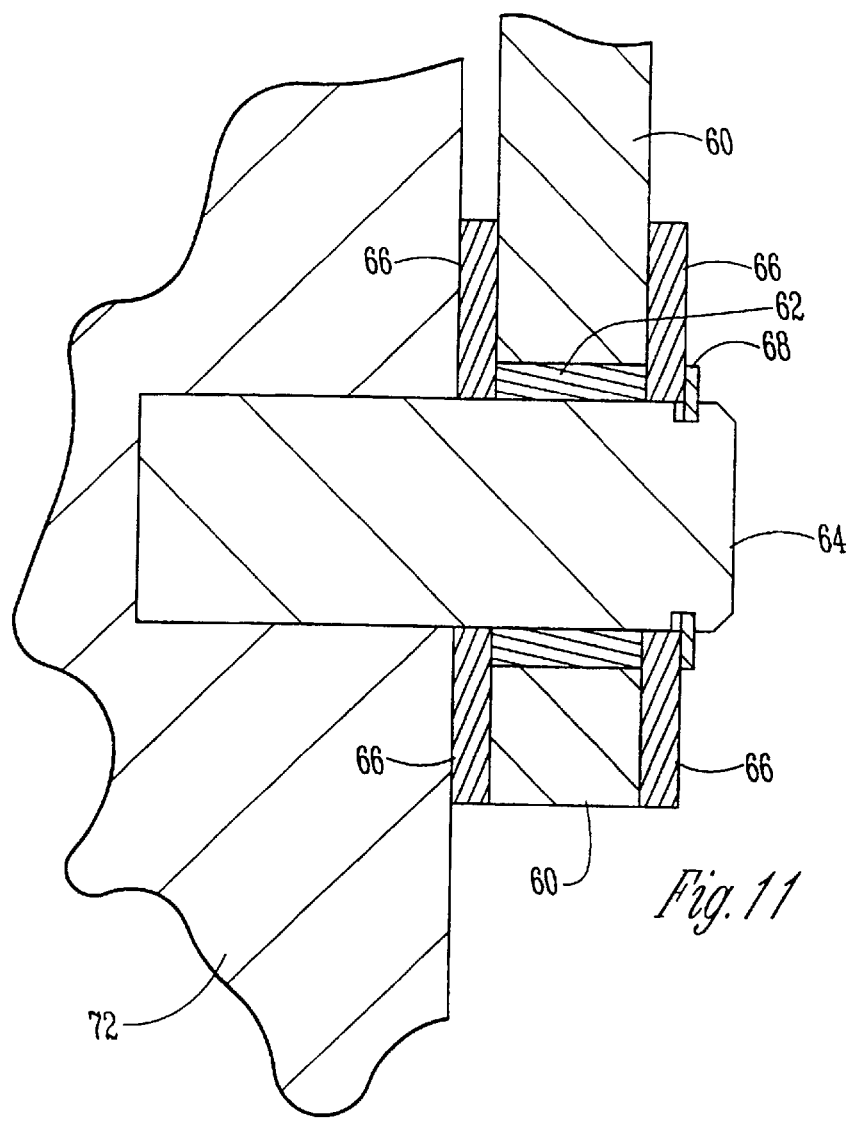
FIG. 11 is a sectional view taken on line 11—11 of FIG. 9.
Figure 14:
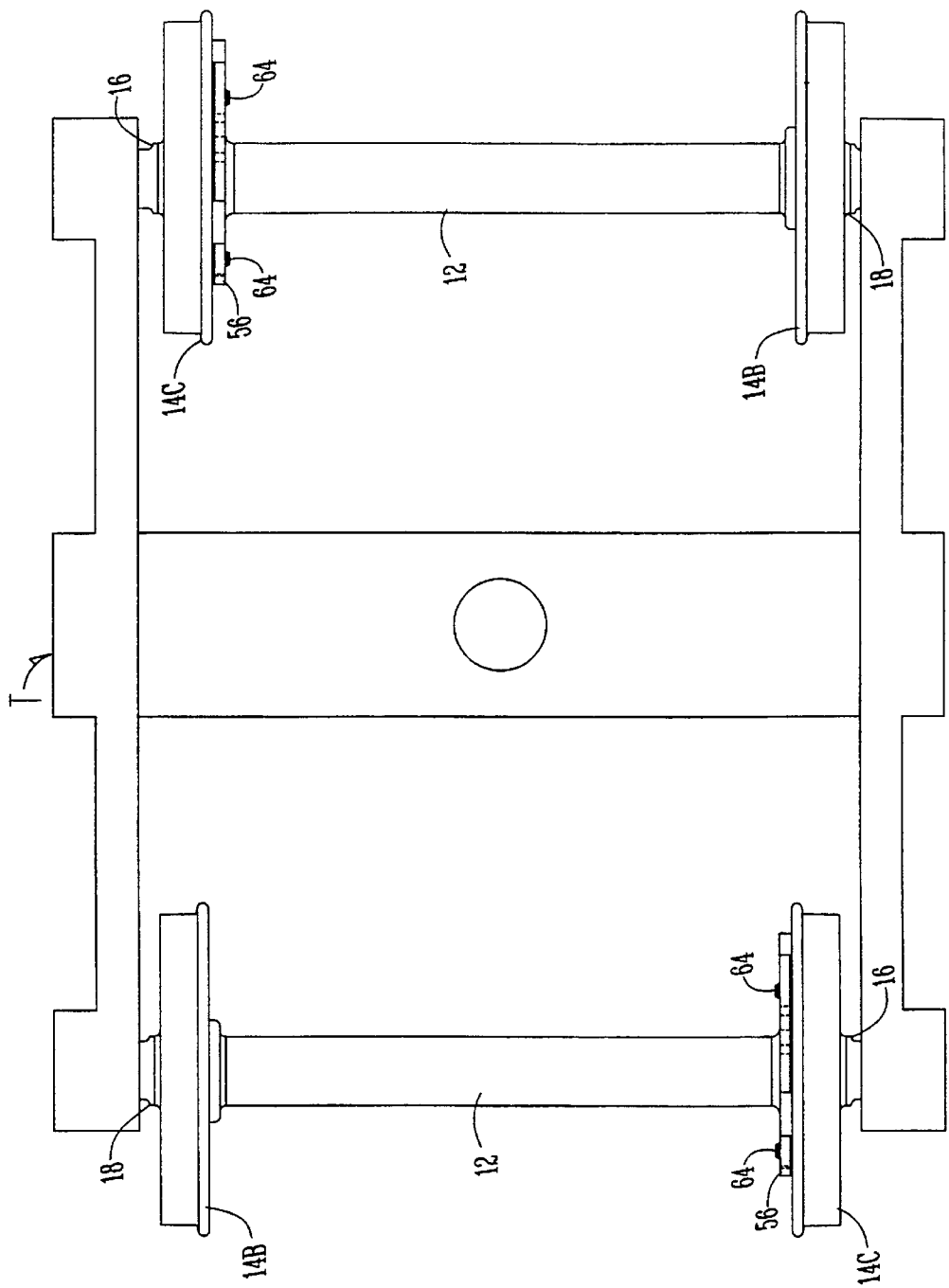
FIG. 14 is a plan view showing the positions of the locking devices of FIGS. 12 and 13 of the independently rotatable wheels as the axles are mounted in a truck frame.

An alternate embodiment of the foregoing invention is shown in FIGS. 12, 13 and 14. With reference to FIGS. 12, 13 and 14, the wheel 14C is capable of independent rotation with respect to axle 12, as previously described. The axle retainer hub 56A has been modified to provide engagement teeth 58A, each with a near-radial bearing surface on the clockwise side 59, and a sloping surface 59A on the counter-clockwise side. These engagement teeth 58A are for releaseable engagement with a plurality of pivoting double-arm latches 60A which are equipped with self-lubricating bearings 62 mounted on pivot pins 64. (FIG. 8). Each latch has an engagement tooth 61A adapted to nest at times between teeth 58A on hub 56A. As with the structure of FIGS. 9–11, each pivot pin 64 is equipped with self-lubricating thrust bearing latch retainers 66 which are in turn secured by means of stainless steel snap rings 68 or equivalent. Each pivot pin 64 is securely inserted into a latch boss 70 made integral with the wheel. Also integral with and offset from the wheel are a plurality of latch stops 72 which restrict the travel of the pivoting latches 60A from excessive outward travel. Centrifugal force acting on the weighted end 60B of the pivoting latches 60A tends to keep the engagement teeth 61A of these latches in proper position with respect to the axle retainer hub engagement teeth 58A, when the wheel rotates, or, when the wheel is stopped or operating at very slow speeds, gravitational force acting on the weighted ends 60B of the double-arm latches 60A tends to keep the engagement teeth 61A of these latches in engaged position. In FIG. 12, it is to be noted that the arrow indicating direction of rotation relates to the rotation of the axle 12 and axle retainer hub 56A with respect to possible rotation of the independently rotatable wheel 14C and not to the rotation of the wheel with respect to a non-rotating axle. The wheel 14C cannot rotate in a counter-clockwise manner with respect to the axle as shown in FIG. 12.

FIG. 13 shows the above components in play when rotation is in the opposite direction. Although the centrifugal and gravitational forces tend to keep the engagement teeth 61A of the pivoting double-arm latches 56A in proper position for engagement with the teeth 58A of the toothed axle retainer hub 56A, the sloping surface 59A of the teeth of the axle retainer hub prevent the proper engagement of the teeth and permit the wheel to rotate independently in the clockwise direction. Again, it is to be noted that the rotation depicted in FIG. 13 relates to the rotation of axle 12 and the axle retainer hub 56A with respect to possible rotation of the independently rotatable wheel 14C, and not to the rotation of the wheel with respect to a non-rotating axle. The wheel 14C can rotate in a clockwise manner with respect to the axle as shown in FIG. 13. Since the differential rotation of one wheel with respect to the other wheel of a wheelset is not expected to ever exceed 15 RPM, wear to the teeth 61A of the pivoting double-arm latches 60A or to the toothed axle retainer hub is expected to be minimal.

FIG. 14 is a diagram showing placement of the independently rotatable wheels and locking mechanisms for the wheelsets in a railroad car truck T. FIG. 14A shows how both wheels on the axles can rotate independently and be locked in reverse direction.

The foregoing structure of FIGS. 12–14 provide means for automatically locking the independently rotatable wheel 14C to the axle 12 rigidly in one direction, and automatically disengaging the independently rotatable wheel from the axle when rotation is in the opposite direction. This is accomplished by the axle retainer hub 56A being provided with teeth 58A with a near-radial bearing surface 59 on one side to resist rotation toward that surface, and a sloping bearing surface 59A on the other side to permit rotation toward that surface. Pivotable latches 60A with teeth 61A engage the teeth 58A of the axle retainer hub, urged by centrifugal and gravitation forces, but the near-radial and sloping surfaces either augment or prevent the locking action. The locking and disengaging action is automatic at all times. FIG. 12 shows that the rotatable latches of this alternate design have been rotated by centrifugal force and that the teeth of these latches are in contact with the near-radial sides of the teeth of the toothed integral axle retainer, and that the wheel is not free to rotate in this direction. FIG. 13 shows that the rotatable latches of this alternate design have been rotated by centrifugal force but that the teeth of these latches are in contact with the sloping sides of the teeth of the toothed integral axle retainer, and that the wheel is free to rotate in this direction.

With reference to FIGS. 15A, 15B, 15C, 15D and 15E, a further alternate form of the invention is shown.

An outer clutch plate 73 is bolted to the inner face of a wheel such as wheel 14A by suitable bolts extending through holes 74' shown in FIG. 15B. An inner clutch plate 76' is bolted to the inner face of a hub by suitable bolts through holes 78' (FIG. 15A).

FIG. 15A shows groups of slots 82 in the face of inner clutch plate 76'. The slots 82A, 82B, 82C, 82D and 82E are radially and laterally spaced so that the arc between opposite ends of slots 82E is approximately 3°.

Groups of one-way clutch teeth 84 comprised of teeth 84A, 84B, 84C, 84D and 84E are radially aligned on outer clutch plate 73 and are adapted to engage slots 82A–82E in inner clutch plate 76' to restrict the rotation of one wheel in one direction with respect to the wheel on the other end of the wheel. A left hand clutch and a right hand clutch will be required, one for each wheel. These clutches are shown in U.S. Pat. Nos. 5,070,978 and 5,597,057, except that they do not have the above 3° increment of engagement. The groups of teeth 84 are positioned on radii separated typically at 30° intervals.

Figure 15C:
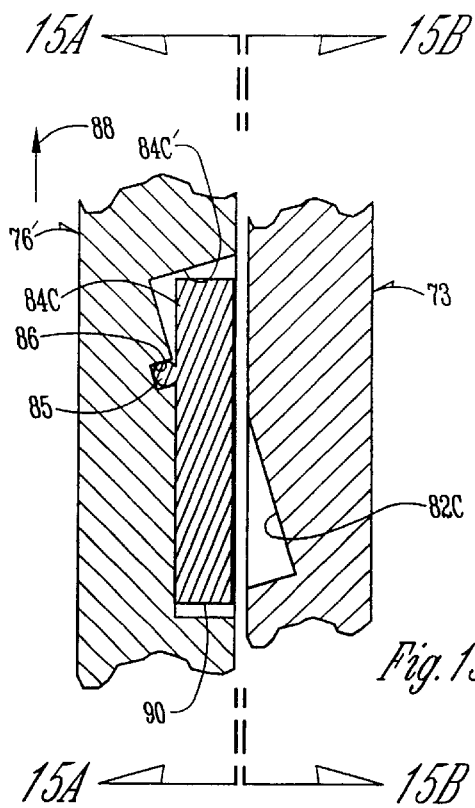
FIG. 15C is a partial sectional view of the clutch plates when they are in a free-wheeling mode typical in the prior art.
Figure 15D:
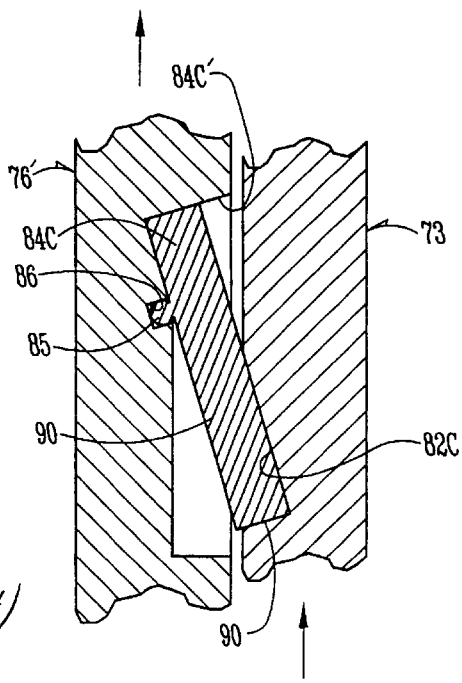
FIG. 15D is a view similar to FIG. 16 but shows the clutch plates in a driving mode.
Figure 15E:
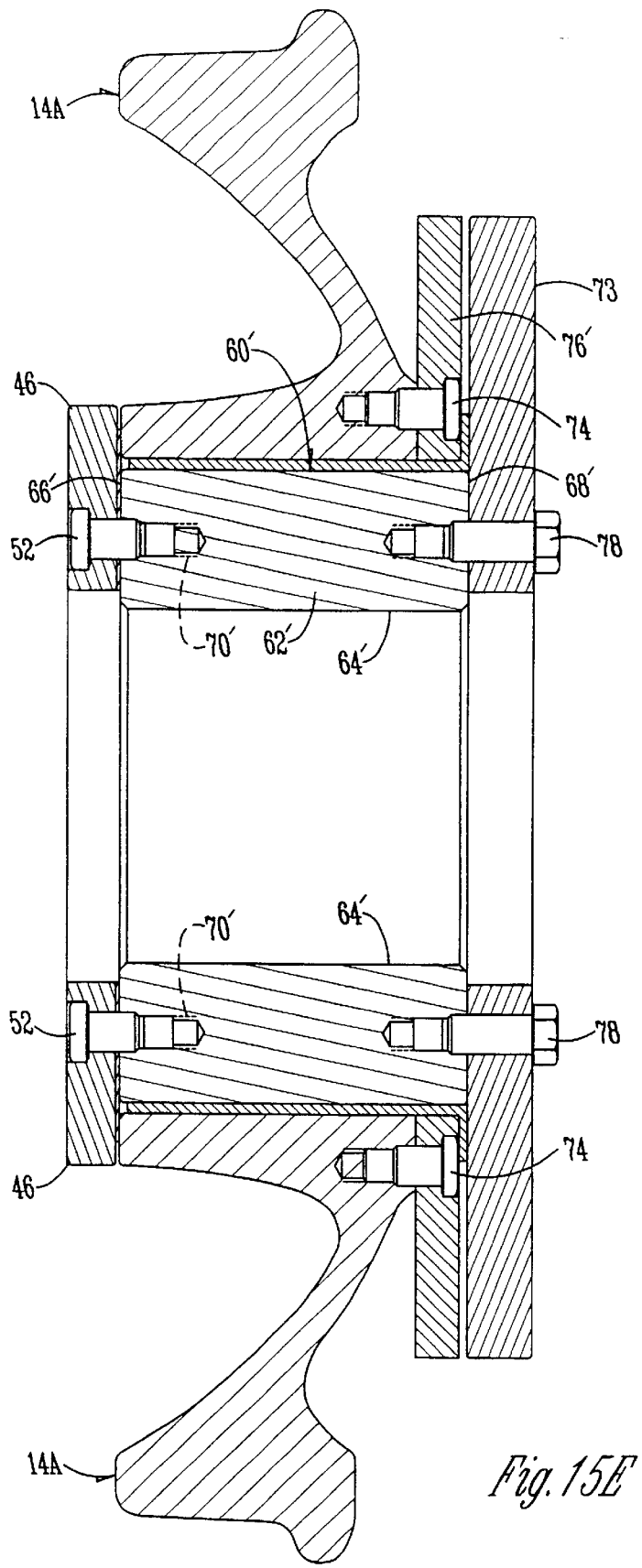
FIG. 15E is a sectional view of the clutch plates mounted on a hub.

With reference to FIGS. 15E and 15D, (see the '978 Patent, FIGS. 5 and 6), a typical tooth 84C is pivotally mounted in an underlying tapered slot 84C'. Each tooth in group 84 pivots about fulcrum 85 dwelling in slot 86 of compatible shape. While as any given slot such as 82C is not in radial alignment with any given slot such as 84C', the tooth 84C will remain entirely recessed in slot 84C'. Each tooth can be spring-biased as disclosed in '057 patent FIGS. 6–9.

Thus, if plate 73 is rotated clockwise, as indicated by arrow 88 in FIG. 15C, the tooth 84C will pass over the slot 82C without engaging the slot 82C. If the plate 73 is rotated fast enough, the teeth will not even have much time to momentarily pivot into slots 82C. On the other hand, if plate 73 is rotated counterclockwise, in the opposite direction to arrow 88, there will be a first slot 84C which radially aligns itself with slot 82C before any other slots do so. When this occurs, the tooth 84C in that first slot 84C' will pivot upward towards its biased position until its forwardmost lengthwise edge 90 engages slot 82C, thereby causing plate 76' to rotate with plate 73. Again, this phenomenon is shown by the '978 and '057 patents.

It will be understood that alternative automatically operating latching mechanisms and restraints may be employed as mechanical equivalents without departing from the spirit of the invention. FIG. 15E shows the foregoing clutch plates 73 and 76 adapted to press-on hubs.

Figure 16:
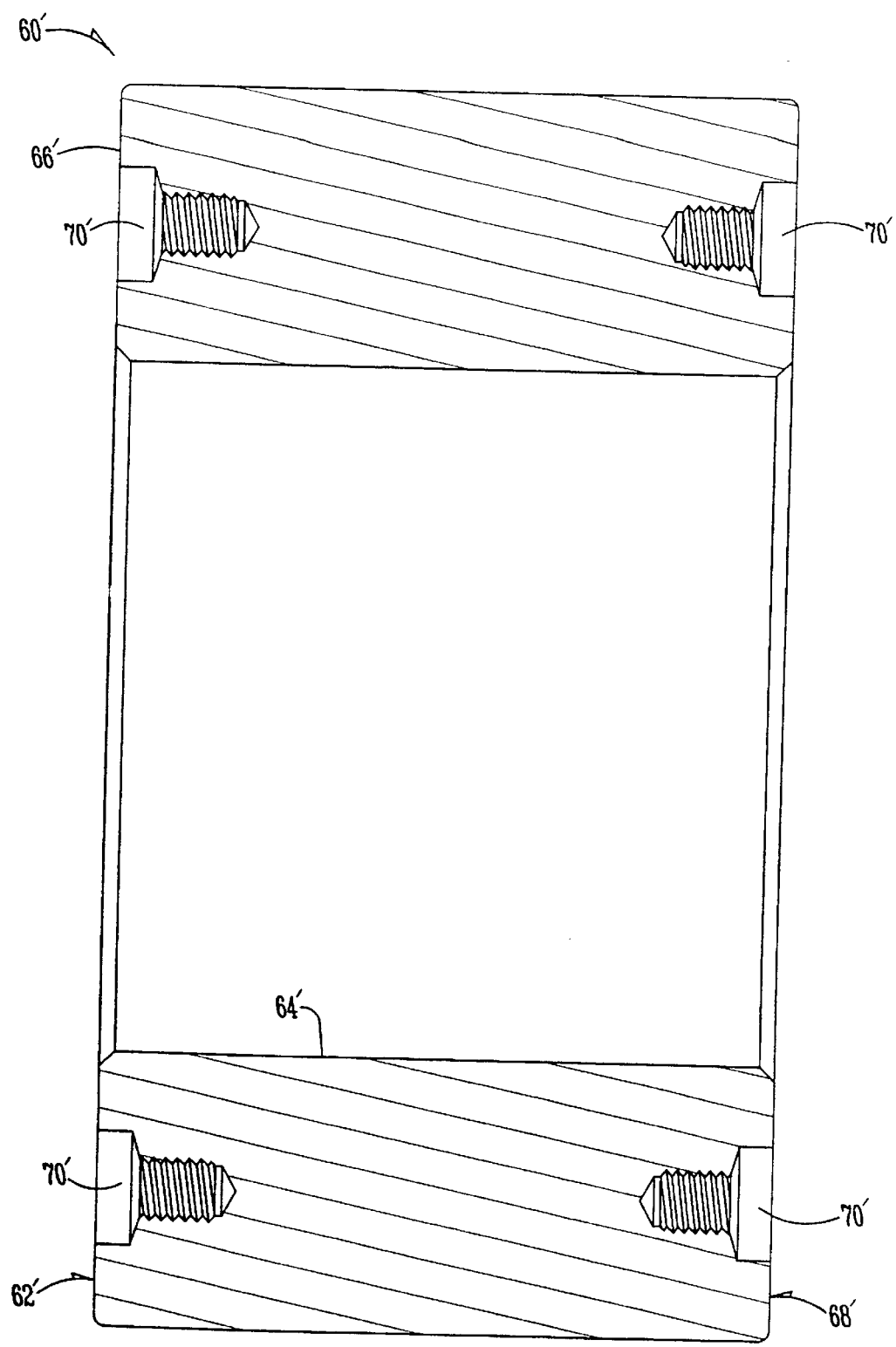
FIG. 16 is a sectional view through an alternate press-on hub that is pressed on the axle.
Figure 17:
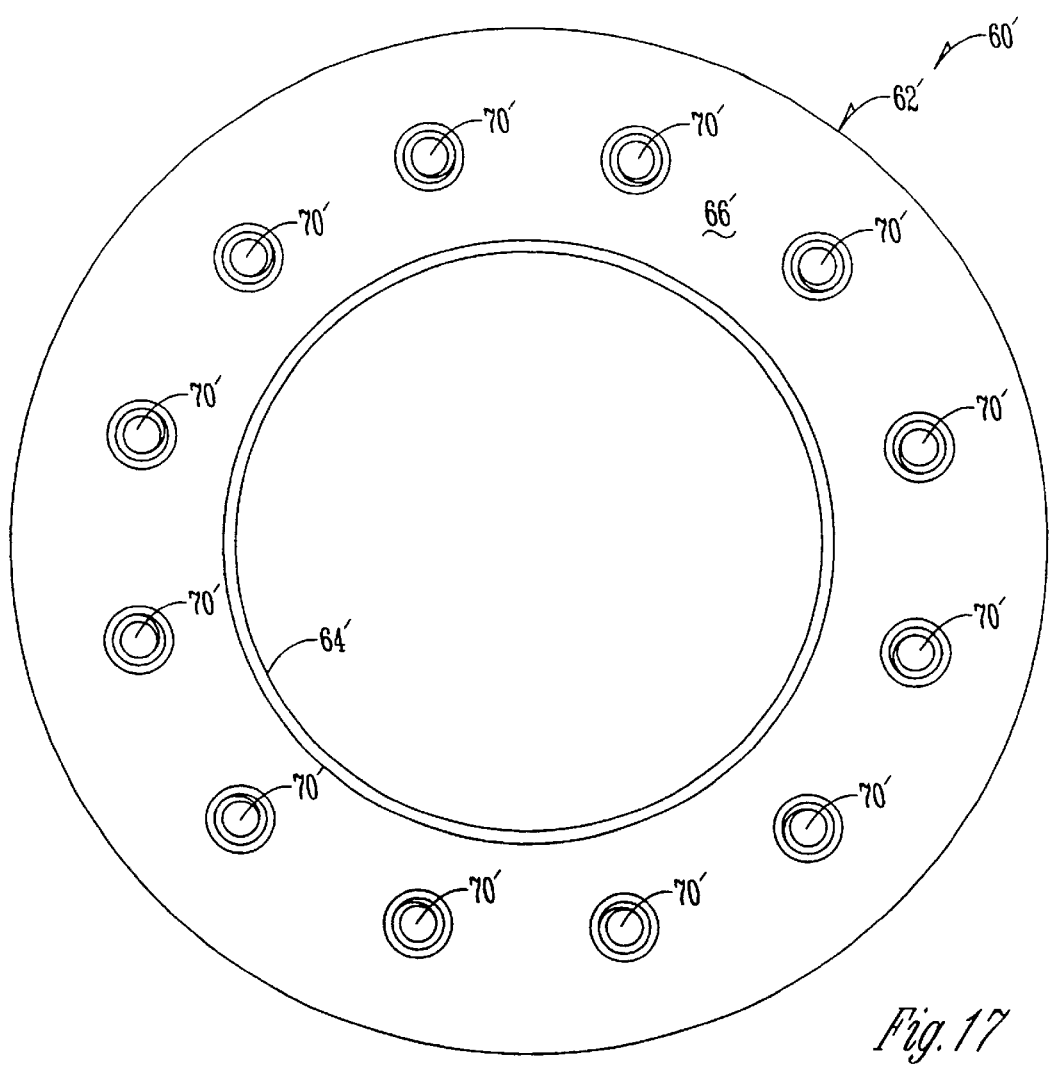
FIG. 17 is an end elevational view of the hub shown in FIG. 18.

A further alternate form of the invention is shown in FIGS. 15E and 17. A press-on hub 60' has a cylindrical body 62', an inner bore 64, opposite faces 66' and 68', and a plurality of threaded apertures 70' in each of the faces (FIGS. 15E and 16 and 17). The diameter of bore 64' frictionally receives the outer diameter of an axle which is force-fit within bore 64'. The hub 60' is shown in assembled condition in FIG. 15E.

Among the advantages of press-on hubs 60' are the following:

1. They are less expensive than integral hubs because much machining is eliminated.
2. Hubs 60' reduce the diameter of the axle, which further reduces cost.
3. Most parts can be identical for all wheel diameters with hubs 60'.
4. The hubs 60' can be replaced without replacing the axle.
5. The hubs 60' can be made of different material than the axle, and different suppliers of hubs are then available for a given axle.

Figure 20:
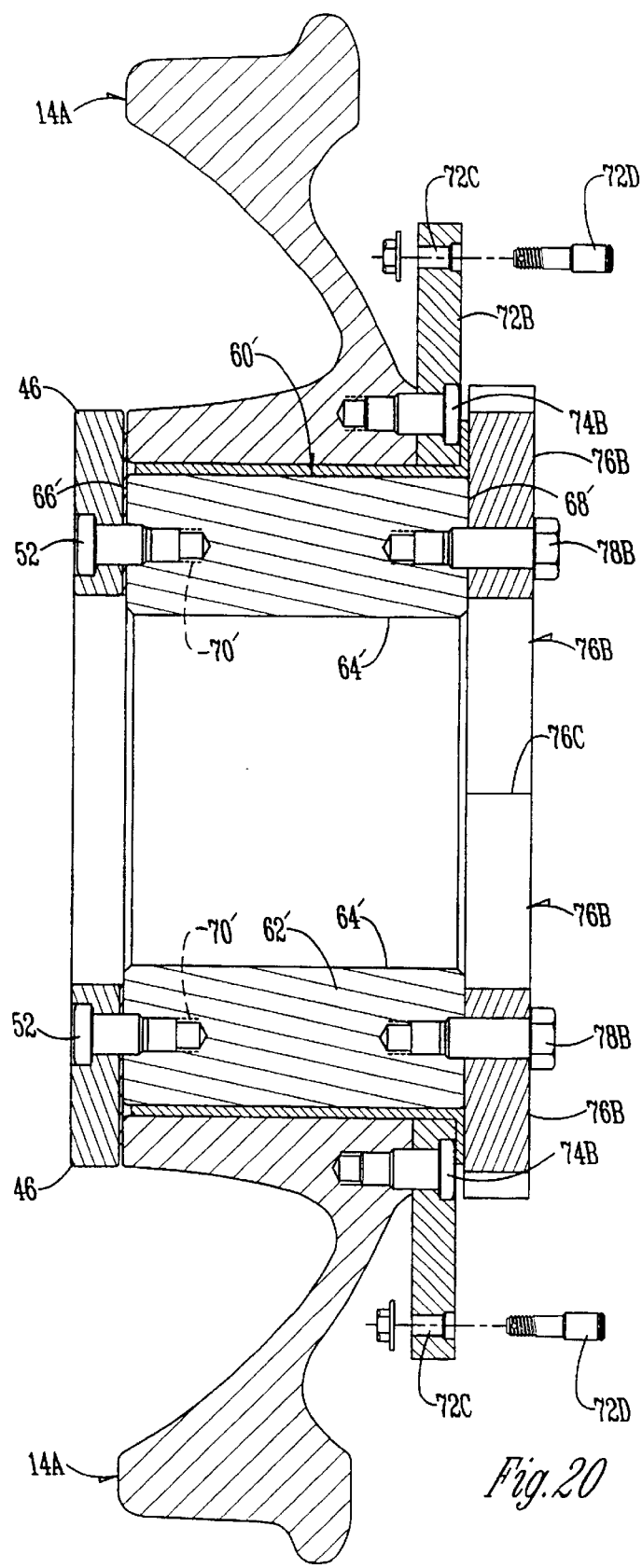
FIG. 20 is a sectional view taken on lines 20—20 of FIG. 18.

A further embodiment of the invention is shown in FIGS. 18–20. This embodiment is similar to that of FIGS. 12 and 14 except that a bolt-on latch pin plate 72B is mounted adjacent plate 76 and secured to wheel 14A by bolts 74B (FIG. 20). Threaded apertures 72C (FIG. 20) receive threaded latch plate pins 72D. Two-piece ratchet gear elements 76B (FIGS. 18–20) with abutting edges 73C are secured to hub 60' by bolts 78B. Creating two ratchet gear elements permits them to be installed after other components without disturbing the other components. Rotating latches 60 are omitted from FIG. 20 for clarity.

This invention herein can be applied to locomotive and/or powered axles as well as to railroad car axles.

From the foregoing, it is seen that all the objectives of this invention are met.

What is claimed is:

1. A railroad car wheelset, comprising, an axle shaft having opposite ends, a first wheel rotatably mounted on one end of said axle shaft, a second wheel rigidly secured to said axle shaft for rotation with said axle shaft, a first clutch plate secured to said first wheel and engagable with locking elements operatively secured to a second clutch plate on said axle shaft to automatically lock said first wheel to said axle shaft when said axle is motionless or operating at slow speeds, and to disengage said locking elements when rotation of said wheels and said axle shaft reach higher predetermined rotational speeds.

2. The device of claim 1 wherein a hub is press fit on the axle.

3. The device of claim 1 wherein one of said clutch plates is secured to a hub on the axle.

4. A railroad car wheelset, comprising, an axle shaft having opposite ends, a first wheel rotatably mounted on one end of said axle shaft, a second wheel rigidly secured to said axle shaft for rotation with said axle shaft, latch elements pivotally secured to said first wheel and engagable with locking elements operatively secured to said axle shaft to automatically lock said first wheel to said axle shaft when said axle is motionless or operating at slow speeds, and to disengage said locking elements when rotation of said wheels and said axle shaft reach higher predetermined rotational speeds wherein a hub is press fit on the axle.

5. The device of claim 4 wherein said latch elements and said locking elements include a two-piece ratchet gear.

6. A railroad car wheelset, comprising, an axle shaft having opposite ends, first and second wheels rotatably mounted on the ends of said axle shafts, latch elements pivotally secured to the first and second wheels engageable with locking elements operatively secured to the axle shaft to automatically lock the wheels to the axle shaft when rotated in a reverse direction, and to rotate independently when moved in an opposite forward direction.

7. The apparatus of claim 6 wherein two of said wheelsets are mounted 180° to each other on a four-wheel truck frame.

8. The apparatus of claim 6 wherein two or more of said wheelsets are mounted on a multi-wheel truck frame.

* * * * *